United States Patent
Weng

(10) Patent No.: US 7,085,988 B1
(45) Date of Patent: Aug. 1, 2006

(54) HASHING SYSTEM UTILIZING ERROR CORRECTION CODING TECHNIQUES

(75) Inventor: Lih-Jyh Weng, Shrewsbury, MA (US)

(73) Assignee: Maxtor Corporation, Longmont, CO (US)

(*) Notice: Subject to any disclaimer, the term of this patent is extended or adjusted under 35 U.S.C. 154(b) by 504 days.

(21) Appl. No.: 10/393,096

(22) Filed: Mar. 20, 2003

Related U.S. Application Data

(60) Provisional application No. 60/371,240, filed on Apr. 8, 2002.

(51) Int. Cl.
*H03M 13/00* (2006.01)

(52) U.S. Cl. .................. 714/758; 714/777; 714/778; 714/781; 714/783; 714/786; 708/492

(58) Field of Classification Search .............. 714/758, 714/786, 777, 778, 781, 783; 708/492
See application file for complete search history.

(56) References Cited

U.S. PATENT DOCUMENTS

| | | | |
|---|---|---|---|
| 4,538,240 A * | 8/1985 | Carter et al. | 708/492 |
| 2002/0062330 A1 * | 5/2002 | Paar et al. | 708/492 |

OTHER PUBLICATIONS

Chaoping Xing et al. 'Constructions of authentication codes from algebraic curves over finite fields,' IEEE Transactions on Information Theory; Publication Date: May 2000; vol. 46, Issue: 3;On pp. 886-892.*

* cited by examiner

*Primary Examiner*—Guy J. Lamarre
(74) *Attorney, Agent, or Firm*—Cesari and McKenna, LLP

(57) ABSTRACT

A hashing system produces hash values by manipulating n-bit sequences in accordance with a selected distance d error correction code ("ECC") over an associated Galois Field. The current system produces a hash value for a given n-bit sequence by treating the sequence as either a corrupted n-bit ECC codeword or as "n" information bits of an (n+r)-bit ECC codeword. The hashing system may decode the n bits as a corrupted codeword of an (n, k, d) perfect ECC to produce an n-bit error-free codeword, and then use as the hash value the information bits of the error-free codeword. Alternatively, the hashing system may treat the n-bit sequence as a corrupted code word of a cyclic distance d ECC, and map the codeword to an (n–k)-bit "error pattern" that the system then uses as the hash value. The hashing system may instead treat the n-bit sequence as n "information" bits and encode the bits in accordance with an (n+r, n, d) ECC, to produce an r-bit hash value that consists of the associated redundancy bits.

16 Claims, 4 Drawing Sheets

HASHING SYSTEM UTILIZING ERROR CORRECTION CODING TECHNIQUES

CROSS-REFERENCE TO RELATED APPLICATION

The present application claims the benefit of U.S. Provisional Patent Application Ser. No. 60/371,240, which was filed on Apr. 8, 2002, by Lih Jyh Weng entitled USING ECC FOR HASHING and is hereby incorporated by reference.

BACKGROUND OF THE INVENTION

1. Field of the Invention

The invention relates generally to hashing systems and, in particular, to hashing systems that manipulate longer bit sequences to produce shorter hash values.

2. Background Information

Hashing functions are typically employed when it is desired to represent a bit sequence using different bits and, in particular, a smaller number of bits. The representation is referred to as a "hash value," or simply as a "hash." The original bit sequence is manipulated in accordance with a hash function, which is selected such that there is little likelihood that different "legitimate" bit sequences will, after manipulation, result in the same hash value, i.e., that the hash values will "collide."

Known hashing systems employ shifting and arithmetic subtraction and/or multiplication operations to manipulate the bit sequences. The circuits to perform the arithmetic subtraction and multiplication operations are, however, relatively complex to implement, particularly when large numbers of bits must be manipulated.

There is a need for a reliable hashing of multiple bit identifiers of disk drives used in small-computer-systems-interface (SAS) environments (See International Committee for Information Technology Standards T10 Technical Committee, "Serial Attached SCSI" Rev. 03, Nov. 21, 2002.), to produce smaller sequences of bits that can be used as device identifiers in standard disk interface environments. More specifically, in an SAS environment the disk drives are identified by 64-bit world-wide-names ("WWNs"), which are also known as world-wide-unique identifiers ("WWUIs"). Over a conventional disk drive interface, however, the drive identifiers may be a maximum size of 24 bits. In order to communicate the 64 bit WWN through a conventional disk drive interface, the 64 bit WWN must thus be represented by a value of 24 or less bits, that is, the WWN must be reliably hashed to a smaller bit sequence. The system described below produces the hash values, without requiring the complex circuits of conventional hashing systems.

SUMMARY OF THE INVENTION

The invention is a hashing system that generates hash values by manipulating bit sequences in accordance with error correction codes ("ECCs") over associated Galois Fields. The current system produces a hash value for a given n-bit sequence by treating the sequence as either an n-bit ECC codeword or as n "information" bits of an (n+r)-bit ECC codeword. The hashing system thus uses Galois Field operations, which are less complex to implement than the arithmetic operations employed by known prior hashing systems.

The operations of the system are described below in connection with binary ECCs. However, the system may use non-binary ECCs in a similar manner.

The current hashing system decodes the n bits as a corrupted ECC codeword using either a perfect (n, k, d) ECC or a cyclic (n, k, d) ECC. A perfect ECC is one that is associated with a complete decoding algorithm, that is, one in which every error pattern is associated with an error-free codeword. A cyclic code is one in which a cyclic shift of a codeword produces another codeword.

When a perfect code is used, the system treats "k" of the bits as information bits and the remaining n−k bits as error correction redundancy bits, and decodes the bits to produce a corresponding error-free n-bit codeword. The system then uses the k information bits of the error-free codeword as the associated hash value. Since the code is perfect, each n-bit sequence and associated "error pattern" correspond to an error-free code word, regardless of how many of the bits in the n-bit sequence are "corrupted."

The k-bit hash values produced by the decoding will not collide as long as the n-bit sequences differ by more than $$\frac{(d-1)}{2}$$

bits. Hamming codes, extended Hamming Codes, Golay codes and extended Golay codes may be used as the hash functions.

Alternatively, the hashing system treats the n-bit sequence as a corrupted codeword of a cyclic (n, k, d) ECC and divides the codeword by the ECC generator polynomial, to produce a hash value that consists of the associated n−k bit remainder. The hash system thus maps the n-bit sequence directly to an associated "error pattern." The (n−k)-bit hash values produced in this manner will not collide as long as the n-bit sequences do not belong to the same coset of the code, as discussed in more detail below.

The hash system may instead treat the n bits as "information bits" and encode the bits in accordance with an (n+r, n, d) ECC, to produce a hash value that consists of the associated r redundancy bits. For n-bit sequences that differ by b bits, with b<d, the hash values differ by at least d−b bits. Collisions may, however, occur if the n-bit sequences differ by more than d bits.

The manner is which the n-bit sequence is manipulated is selected based on such factors as: how close legitimate n-bit sequences are to one another, whether or not a perfect code can be readily designed for the number of bits in the sequence, and so forth. Regardless of which manner is selected, the circuitry for manipulating the bits over the associated Galois Field is much less complex than the circuitry used for manipulating the n-bit sequence in accordance with arithmetic subtraction and multiplication operations.

BRIEF DESCRIPTION OF THE DRAWINGS

The invention description below refers to the accompanying drawings, of which.

DETAILED DESCRIPTION OF AN ILLUSTRATIVE EMBODIMENT

The hashing system of FIGS. 1–4 manipulates n-bit sequences in accordance with an error correction code ("ECC") over the associated Galois Field, to produce corresponding hash values. The respective n-bit sequences are treated as either "corrupted" n-bit ECC codewords or as n "information" bits of an (n+r)-bit ECC codeword. The n-bit sequences are manipulated in accordance with the ECCs using Galois field operations, which are much less complex to implement than the corresponding arithmetic operations.

In a first example, a hashing system treats the n-bit sequence as an n-bit corrupted codeword of an (n, k, d) perfect ECC. The system decodes the corrupted codeword into an error-free codeword, by treating k of the bits as information bits and the remaining n−k bits as ECC redundancy bits. The hashing system then uses as the hash value the k information bits of the associated error free codeword.

A perfect ECC is associated with a complete decoding algorithm. Accordingly, each n-bit sequence decodes to an error-free codeword, regardless of how many of the n-bits are "corrupted." Codes that are associated with complete decoding algorithms are Hamming codes and Golay codes. Extended Hamming codes and Extended Golay codes may also be used, however the decoding must force a given corrupted codeword that is equally distant from a number of error-free codewords to a particular one of the error-free codewords. Collisions may occur if the n-bit sequences differ by fewer than $$\frac{(d-1)}{2}$$

bits.

The known binary perfect codes are Hamming ($2^m-1$, $2^m-1-m$, 3) codes for any integer m and the Golay (23, 12, 7) code. The extended codes are Hamming ($2^m$, $2^m-1-m$, 4) codes and the Golay (24, 12, 8) code. The extended Golay code may be used be used as long as the decoding maps respective corrupted codewords to corresponding codewords of the extended ECC. Further, a ternary Golay (11, 6, 5) code and its extension ternary (12, 6, 6) code may also used. Shortened cyclic codes may also be used. An example of a shortened code is a binary Hamming (8, 3, 4) code.

Figure 1:
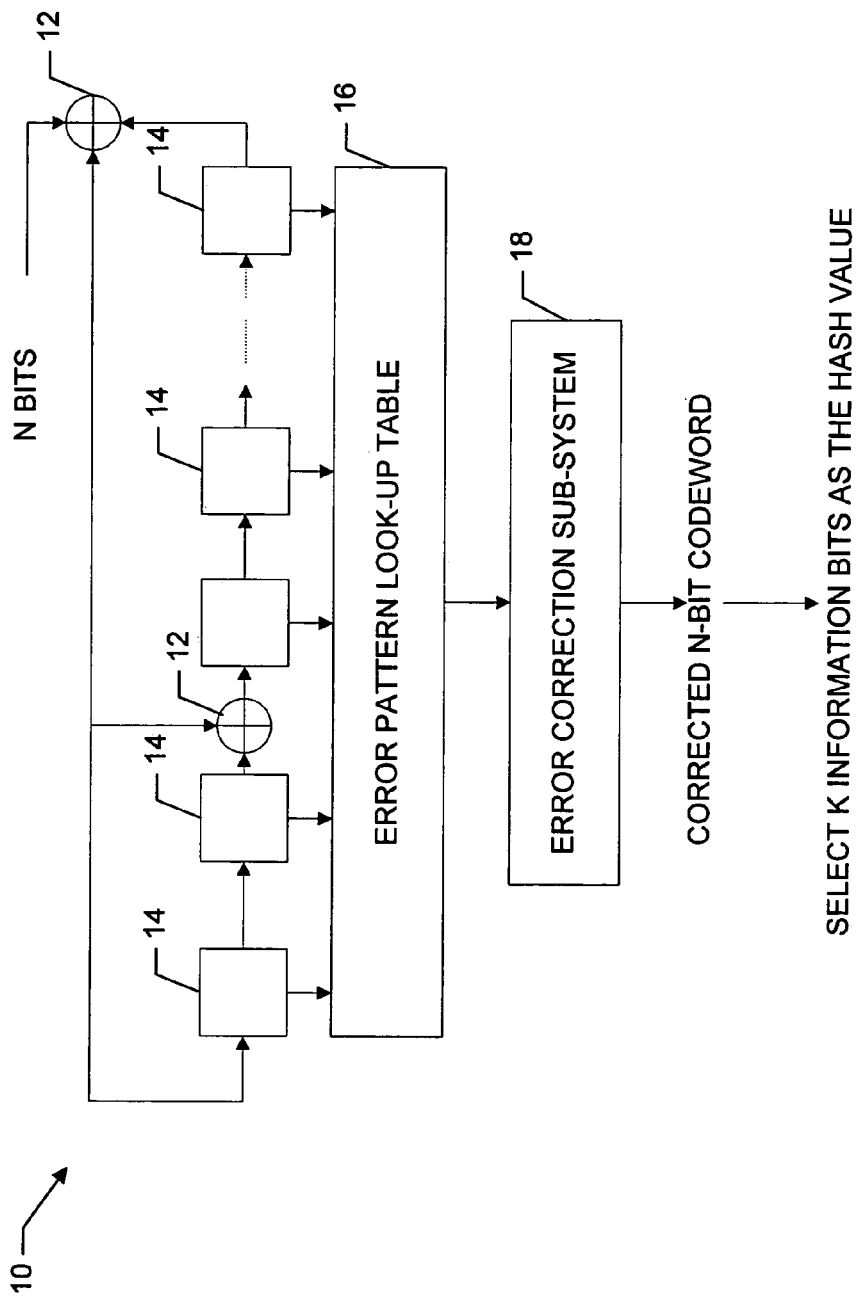
FIG. 1 is a hashing system that uses an (n, k, d) perfect code.

Referring now to FIG. 1, a decoder 10 for a cyclic Hamming code is shown. The n bits are fed through a first Galois field adder 12 to registers 14 and adders 12 that manipulate the bits in accordance with the cyclic Hamming code. After the last of the n bits is supplied, the contents of the registers 14 are used to enter an Error Pattern Look-Up Table 16. The table 16 supplies an associated n-bit error pattern to an Error Correction sub-system 18, which combines the error pattern with the n bit sequence to produce a corrected n-bit code word. The system then selects as the hash value the k bits that correspond to the information bits of the error-free codeword.

The Error Correction sub-system may be, for example, a set of XOR gates (not shown). The hash value is thus produced using Galois Field adders, registers, a look-up table, and XOR gates. The system set up for a Golay or extended Golay code uses similar arrangements of Galois Field adders, registers, and so forth.

The n-bit sequence may instead be treated as a "corrupted" codeword of a cyclic (n, k, d) code, with the n-bit sequence hashed into an n−k bit remainder that corresponds to the "error pattern" associated with the corrupted codeword. If there are fewer than $$\frac{d}{2},$$

errors and all of the errors occur in the n−k "redundancy" bit positions, the errors are mapped directly to the corresponding bits of the (n−k)-bit remainder. Otherwise, the errors are mapped to various patterns in the n bits. Accordingly, the hash values may collide if the n-bit sequences differ by fewer than $$\frac{(d-1)}{2}$$

bits.

Figure 2:
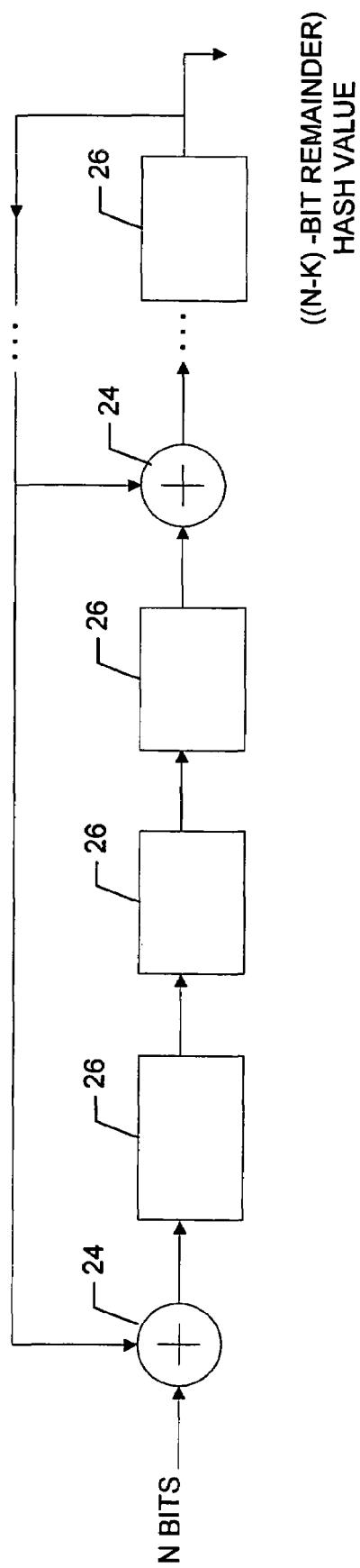
FIG. 2 is a hashing system that uses an (n, k, d) cyclic code.

Referring now to FIG. 2, the hashing system consists of registers 26 and Galois Field adders 24 arranged in accordance with the generator polynomial of the associated cyclic ECC. The bits, which are supplied to the hashing system through a first Galois Field adder 24, are fed to appropriate registers and adders such that the system divides the n-bit sequence by the generator polynomial. After the last bit of a given sequences is supplied, the contents of the registers 26 are the associated (n−k) bit remainder, or hash value. The n−k bit hash value may be read from the registers serially or in parallel.

The hash values for two n-bit sequences collide if the n-bit sequences are members of the same coset of the ECC. A coset contains $2^{n-k}$ n-bit sequences of the form c+w, where c is a fixed n-bit pattern and w is any codeword of the (n, k, d) code. Thus, the n-bit sequences $c+w_1$ and $c+w_2$ will be associated with the same (n−k)-bit hash value.

The system of FIG. 2 is well suited to produce 24-bit hash values for 64-bit sequences that are assigned as world wide names ("WWNs") to devices such as, for example, disk drives. Two particular codes that minimize the likelihood of different 64-bit sequences hashing to the same 24-bit hash value are (63, 39, 3) and (63, 39, 9) codes. Before the sequence is manipulated in accordance with either code, the system XORs the first bit of the sequence to the last bit of the sequence, to produce a 63-bit representation of the WWN. The system then manipulates the 63 bits by dividing the bits by the generator polynomial of the selected code, to produce the associated 24-bit hash value.

The coefficients for the generator polynomial of the (63, 39, 3) are, in hexidecimal notation, 1cde505. The coefficients for the generator polynomial of the (63, 39, 9) code are 1db2777 in hexidecimal notation.

Figure 3:
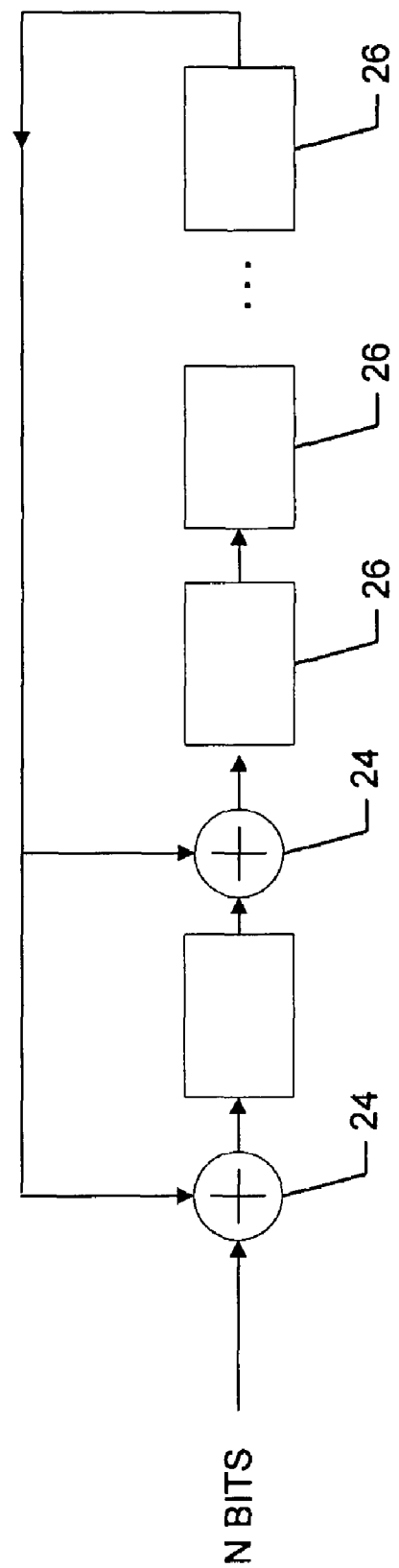
FIG. 3 is a hashing system that uses a particular (n, k, d) cyclic code.

As depicted in FIG. 3, the hash system for producing 24-bit hash values for 64-bit WWNs includes various adders 24 and registers 26 that are connected in accordance with the coefficients of the selected generator polynomial. The 64 bits are fed serially into the first Galois Field adder 24 and manipulated in accordance with the selected generator polynomial. After the $64^{th}$ bit is supplied, the registers 26 contain the same result as if the first and last bit of the sequence were combined to produce a corresponding 63 bit sequence. Alternatively, the first and last bits could be combined prior to supplying the then 63 bits to the system.

After manipulation of the 64 or 63 bits, as appropriate, the system produces, in the registers 26, a 24-bit remainder or "error pattern" that is the corresponding 24-bit hash value. As discussed, the respective hash values will not collide as long as the n-bit sequences are not part of the same coset of the ECC.

Figure 4:
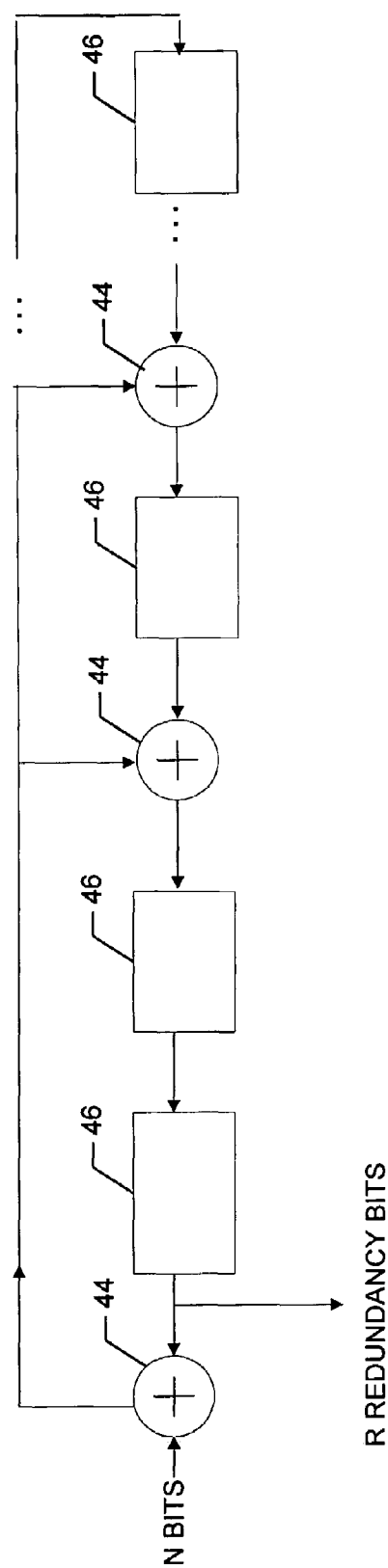
FIG. 4 is a hashing system that uses an (n+r, r, d) cyclic code.

Referring now to FIG. 4, the hashing system may instead treat the n-bit sequence as n information bits and encode the bits in accordance with an (n+r, n, d) ECC. The system includes adders 44 and registers 46 that are arranged to divide the bits by the ECC generator polynomial. After the last, or $n^{th}$, bit is supplied, the registers 46 contain the associated r "redundancy" bits that constitute the hash value.

For two n-bit sequences that differ by b-bits, with b<d, the system produces hash values that differ by at least d−b bits. The hash values for two n-bit sequences that differ by more than d bits may, however, collide.

Two codes suitable for the 64-bit WWNs are an (88, 64, 8) code that has a generator polynomial with coefficients 1da1077 in hexidecimal representation and an (88, 64, 3) code and that has a generator polynomial with coefficients 11016fb in hexidecimal representation.

The determination of how to treat the n-bit sequence, i.e., as either a corrupt EEC codeword of a perfect or cyclic code or as n information bits of a longer ECC, is based essentially on how close one legitimate n-bit sequence is to another, the associated likelihood of collision, and so forth. As discussed, regardless of how the n-bit sequence is manipulated in accordance with the selected ECC, the hashing system consists essentially of properly arranged Galois Field adders and registers. Accordingly, the hashing system is less complex than known prior systems that require circuitry that implements arithmetic multiplication and/or subtraction operations.

What is claimed is:

1. A hashing system for producing for an n-bit sequence a hash value with fewer bits, the system including:
   A. a plurality of Galois Field adders and registers that are arranged to manipulate the n-bit sequence in accordance with a generator polynomial of a distance d error correction code to produce associated error correction values in the registers; and
   B. means for producing a hash value that corresponds to the contents of all or selected registers.

2. The hashing system of claim 1 wherein
   the Galois Field adders and registers are arranged to divide the n-bit sequence by the generator polynomial of a cyclic (n, k, d) error correction code, and
   the means reads from the registers error correction values that consist of an (n−k)-bit hash value that is the remainder of the division operation.

3. The hashing system of claim 2 wherein the (n, k, d) error correction code produces for a 64-bit sequence a 24-bit hash value.

4. The hashing system of claim 3 wherein the error correction code is a (63, 24, d) code, where d is a selected distance value.

5. The hashing system of claim 1 wherein
   the Galois Field adders and registers are arranged to manipulate the n-bit sequence in accordance with the generator polynomial of an (n+r, n, d) error correction code; and
   the means reads from the registers error correction values that consist of an r-bit hash value that corresponds to r associated redundancy bits.

6. The hashing system of claim 1 wherein
   the error correction values are used to enter a look-up table that provides values that are combined with the n-bit sequence to produce an n-bit error-free codeword of an (n, k, d) error correction code, and
   the means selects as the hash value the k bits that correspond to the k information bits of the error-free codeword.

7. The hashing system of claim 6 wherein the error correction code is a perfect code.

8. The hashing system of claim 7 wherein the error correction code is one of a Hamming Code, a Golay Code, an Extended Hamming Code, an Extended Golay Code, a ternary Golay code and an extension ternary Golay code.

9. A method for manipulating an n-bit sequence to produce a corresponding hash value, the method including the steps of:
   A. manipulating the n-bit sequence in accordance with a generator polynomial of a distance d error correction code to produce associated error correction values; and
   B. interpreting selected bits of the error correction values produced as a result of the manipulation as the hash value.

10. The method of claim 9 wherein the step of
    manipulating the n-bit sequence includes dividing the sequence by the generator polynomial of a cyclic (n, k, d) error correction code, and
    the step of interpreting includes selecting as the hash value the error correction values that consist of the (n−k)-bit remainder of the division operation.

11. The method of claim 10 wherein the error correction code produces for a 64-bit sequence a 24-bit hash value.

12. The method of claim 11 wherein the step of manipulating further includes manipulating the 64-bit sequence in accordance with a (63, 24, d) error correction code, where d is a selected distance value.

13. The method of claim 9 wherein the step of
    manipulating the n-bit sequence includes manipulating the sequence as n information bits in accordance with the generator polynomial of an (n+r, n, d) error correction code; and
    the step of interpreting includes selecting as the hash value the error correction values that consist of r associated redundancy bits.

14. The method of claim 9 wherein the step of
    manipulating the n-bit sequence includes manipulating the sequence as an n-bit corrupted codeword of an (n, k, d) error correction code to produce error correction values that consist of an n-bit error-free codeword, and
    the step of interpreting includes selecting as the hash value the error correction values that consist of k bits that correspond to the codeword information bits of the error-free codeword.

15. The method of claim 14 wherein the step of manipulating further includes manipulating the sequence in accordance with a perfect code.

16. The method of claim 15 wherein the perfect code is one of a Hamming Code, a Golay Code, an Extended Hamming Code, an Extended Golay Code, a ternary Golay code and an extension ternary Golay code.

* * * * *